United States Patent [19]

Landais

[11] Patent Number: 4,920,869
[45] Date of Patent: May 1, 1990

[54] HOUSEHOLD COFFEEMAKER

[75] Inventor: Francis, P. J. Landais, Alencon, France

[73] Assignee: Moulinex, Societe Anonyme, Bagnolet, France

[21] Appl. No.: 294,811

[22] Filed: Jan. 9, 1989

[30] Foreign Application Priority Data

Jan. 14, 1988 [FR] France ................... 88 00384

[51] Int. Cl.⁵ .................................... A47J 31/00
[52] U.S. Cl. ..................................... 99/283; 99/305
[58] Field of Search ............... 99/279, 280, 283, 295, 99/299, 300, 304, 305, 306, 307; 426/433

[56] References Cited

U.S. PATENT DOCUMENTS

| | | | |
|---|---|---|---|
| 3,333,527 | 8/1967 | Bender | 99/283 |
| 3,972,273 | 8/1976 | Carlson | 99/305 |
| 4,083,295 | 4/1978 | Hollingsworth | 99/283 |
| 4,613,745 | 9/1986 | Marotta | 99/305 |
| 4,790,240 | 12/1988 | Henn | 99/283 |

Primary Examiner—Robert W. Jenkins
Attorney, Agent, or Firm—Young & Thompson

[57] ABSTRACT

Coffeemaker comprising a filter 20 which is dripped on by a head 18 having a principal opening 30 adapted to drip on the central region of the filter, as well as a series of holes 34 spaced apart about said opening 30 and adapted to drip on the peripheral region of the filter. The head 18 is provided with a valve 38 which is controlled by a timing device 40 which permits flow of hot water through the opening 30 only after a so-called "steeping" period in the course of which the hot water flows only through the holes 34.

5 Claims, 1 Drawing Sheet

HOUSEHOLD COFFEEMAKER

The invention relates to household coffeemakers comprising, in a casing, a reservoir of cold water as well as a water heater fed by this reservoir and in turn feeding, by a tube for hot water, a drip head adapted to drip on a filter containing coffee powder and which is located, in operative position, below this head, and above a collecting receptacle for the infusion.

It relates more particularly to coffeemakers whose head has a principal opening adapted to drip on the central region of the filter, when this filter is in place in operative position, as well as a series of holes spaced about said central opening and adapted to drip on the peripheral zone of said filter.

It will be understood that with such a distribution of holes and openings in the head, the coffee powder is continuously dripped on over all its surface and therefore throughout its mass, from the beginning of the entry of hot water into the head until the end of the preparation of the infusion. However, it has been determined that such an arrangement results in too much dripping on this mass of coffee powder which is accordingly subjected to an abrupt and too rapid "washing" which does not permit extracting the maximum flavor to produce an excellent infusion of coffee.

The invention has for its object to overcome this drawback by means of an improvement in the dripping device.

According to the invention, the head is provided with a valve which is controlled by a timing device and which can occupy either a position to close the principal opening in which the flow of hot water takes place solely through the series of holes and in which it is maintained for a predetermined time of "steeping" set by the timing device, or an open position in which the flow of hot water then takes place through the principal opening and in which it is maintained for all of a so-called "infusion" period which follows said "steeping" period.

Thanks to the timed valve, dripping takes place not only in a progressive manner but also in two different regions of the coffee powder, permitting, for a first time, during the "steeping" period to "swell" particularly the peripheral region of this mass of coffee powder, and for a second time, to cause in the usual manner the "washing" of this mass in its central region, these two dripping stages thus permitting to extract the maximum flavor from this mass of coffee powder.

The characteristics and advantages of the invention will thus be seen from the description which follows, by way of example, with reference to the accompanying drawing in which.

Figure 1:
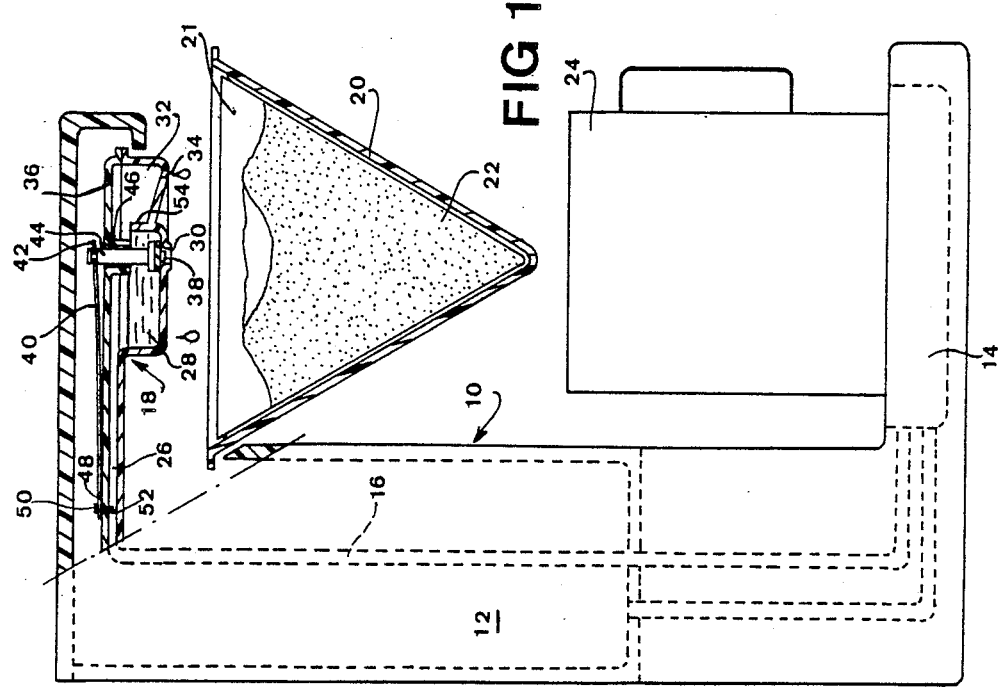
FIG. 1 shows, partially in elevation and partially in cross section a coffeemaker according to the invention with the head provided with a valve in closed position.

The coffeemaker shown in FIG. 1 comprises, in a casing 10, a cold water reservoir 12, as well as a water heater 14 fed by this reservoir and itself feeding, by a tube 16 for ascending hot water, a drip head 18 adapted to drip on a removable filter 20 known per se, whose bottom is perforated and which contains a filter element 21 adapted to receive powdered coffee 22.

Figure 3:
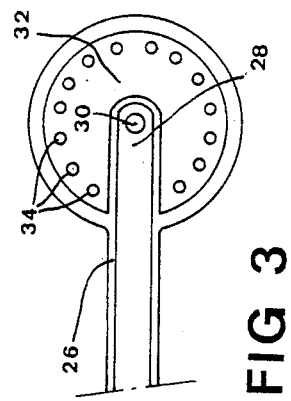
FIG. 3 is a view from above of the head after removing the cover of this head and of the valve.

This filter is installed in the casing 10 by means of any known device, not shown, so as to be secured in working position below the head 18 and above a collecting receptacle 24 for the infusion. As will be better seen in FIG. 3, the head 18 comprises a horizontal conduit 26 which opens into a first basin 28 whose bottom has a principal opening 30 of fairly large diameter, as well as a second basin 32 partially surrounding the first basin 28 and having a series of holes 34 spaced about the opening 30 and each having a diameter smaller than the diameter of opening 30. Said first and second basins 28-32 are covered by a cover 36 which constitutes also the upper wall of the conduit 26. Principal opening 30 is adapted to drip on the central region of the filter 20, when this filter is disposed in working position, while the series of holes 34 is adapted to drip on the peripheral region of this filter 20.

According to the invention, the head 18 is provided with a valve 38 which is controlled by a timing device 40 and which can occupy either a position closing the principal opening 30 (FIG. 1) in which the flow of hot water takes place solely through the series of holes 34 and in which it is maintained for a predetermined so-called "steeping" time fixed by the timing device 40 (FIG. 1), or an open position in which the flow of hot water then takes place through the principal opening 30 and in which it is maintained for all of a so-called "infusion" period which follows said "steeping" period.

The timing device 40 is constituted by a thermostatic element such as a bimetal. This bimetal has an oblong form and extends longitudinally along the cover 36 of the head and comprises an end 42 connected to the valve 38 by means of a slide member 44 mounted for vertical movement above the opening 30, in a bearing 46 provided in this cover 36, as well as an end 48 secured on the upper wall 36 of the conduit 26 by means of a securement means 50 of a material which is a good conductor of heat, for example a metal, and whose one portion 52 projects into this conduit 26 so as to transmit directly the temperature of the hot water to the bimetal 40.

As will be understood, in the operative mode of the coffeemaker, the bimetal 40 and the valve 38 occupy their respective positions shown in FIG. 1. After several minutes of heating, the hot water leaving the water heater 14 rises through tube 16 and arrives by conduit 26 in first basin 28. Bimetal 40 still being cold, holds the valve 38 in its position closing the opening 30, and the hot water filling this basin overflows the common wall 54 and thus flows in a regular manner into the second basin 32. This hot water, then passing through the series of holes 34, drips in a regular fashion onto the peripheral region of the coffee powder 22, then flows through this powder and causes it progressively to swell, through practically all of its mass, from its peripheral region to its central region.

Figure 2:
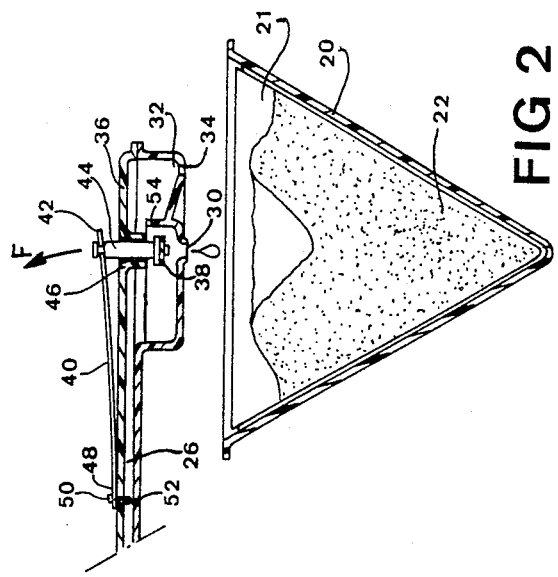
FIG. 2 is a view analogous to the section of FIG. 1, showing particularly the valve in open position.

In the course of this dripping, the bimetal is influenced by the temperature of the hot water (95° C.), not only detected by the portion 52 of the securement member 50, but also transmitted by the upper wall 36 of the conduit 26. It follows that the bimetal 40 deforms in an upward direction (arrow F in FIG. 2), and by its end 42 raises the slide member 44, thus moving the valve 38 to its open position. This deformation of the bimetal to the open valve position terminates the "steeping" period which is preferably of the order of a minute and 30 seconds. When the valve moves to its open position and during all the infusion period, the hot water flows solely through the principal opening 30 and drips in the usual fashion on the coffee powder solely in the central region. Thus, thanks to these two successive dripping phases, there is obtained a complete "washing" of the mass of coffee powder resulting in maximum extraction of the flavor of this coffee powder.

I claim:

1. Household coffeemaker comprising, in a casing (10), a cold water reservoir (12) as well as a water heater (14) fed by said reservoir and itself feeding through a hot water tube (16) to a dripping head (18) adapted to drip on to a filter (20-21) which contains coffee powder (22) and which is located, in operative position, below said head, and above a collecting receptacle (24) for the infusion, said head (18) having a principal opening (30) adapted to drip on the central region of the filter (20-21) when this filter is disposed in operative position, as well as a series of holes (34) distributed about said central opening (30) and adapted to drip on the peripheral region of said filter, wherein the head (18) is provided with a valve (38) which is controlled by a timing device (40) and which can occupy, either a position closing the principal opening (30) in which the flow of hot water takes place only through the series of holes (34) and in which it is maintained for a predetermined so-called "steeping" period set by the timing device (40), or an open position, in which the flow of hot water then takes place through the principal opening and in which it is maintained through all of a so-called "infusion" period which follows said "steeping" period.

2. Coffeemaker according to claim 1, wherein the timing device (40) is a thermostatic element which is provided on the head (18) and is so disposed as to be influenced by the temperature of the hot water in this head.

3. Coffeemaker according to claim 2, wherein the thermostatic element (40) is a bimetal of oblong form whose one end (42) is connected to the valve (38) by means of a slide member (44) vertically movably mounted in a bearing (46) secured to the head (18) and whose other end (48) is secured to the upper wall (36) of the head by means of a securement member (50).

4. Coffeemaker according to claim 3, wherein the securement member (50) of the bimetal (40) comprises a heat conductive portion (52) which projects into the head (18) so as to transmit directly the temperature of the hot water to the bimetal (40).

5. Coffeemaker according to claim 1, wherein the head (18) comprises a first basin (28) in which the hot water arrives directly and whose bottom has the principal opening (30), as well as a second basin (32) partially surrounding said first basin and having the series of holes (34), the height of the common wall (54) between these basins being such that it permits overflow of water from the first basin to the second basin.

* * * * *